(12) United States Patent
Woods

(10) Patent No.: US 12,479,737 B1
(45) Date of Patent: *Nov. 25, 2025

(54) PROCESS FOR FABRICATING WIRE-EMBEDDED ZEOLITE STRUCTURES WITH BARE WIRE LEADS

(71) Applicant: Mainstream Engineering Corporation, Rockledge, FL (US)

(72) Inventor: Benjamin S. Woods, Melbourne, FL (US)

(73) Assignee: Mainstream Engineering Corporation, Rockledge, FL (US)

(*) Notice: Subject to any disclaimer, the term of this patent is extended or adjusted under 35 U.S.C. 154(b) by 460 days.

This patent is subject to a terminal disclaimer.

(21) Appl. No.: 18/177,848

(22) Filed: Mar. 3, 2023

(51) Int. Cl.
*C01B 39/02* (2006.01)
*B33Y 10/00* (2015.01)
*B33Y 70/00* (2020.01)
*B33Y 80/00* (2015.01)

(52) U.S. Cl.
CPC ............ *C01B 39/026* (2013.01); *B33Y 10/00* (2014.12); *B33Y 70/00* (2014.12); *B33Y 80/00* (2014.12)

(58) Field of Classification Search
None
See application file for complete search history.

(56) References Cited

U.S. PATENT DOCUMENTS 4,246,228 A * 1/1981 Jones .................... G01N 27/16
436/151

* cited by examiner

*Primary Examiner* — Sheng H Davis
(74) *Attorney, Agent, or Firm* — Michael W. O'Neill, Esq.

(57) ABSTRACT

A process for fabricating a structure of a zeolite-based paste with an intra-layer continuous wire embedded is disclosed. The structure is made of multiple layers stacked together, produced by an additive manufacturing (3D printing) process. Within this structure, at least one wire is embedded through a section of a layer or a layer in its entirety, where the wire comprises of both the encapsulated section within the structure and two bare wire leads protruding from the structure. The flowcharts for the overall process of the structure fabrication, as well as a flowchart for the specific process of fabricating the wire embedded layers is disclosed. The primary goal of this process is to fabricate a zeolite structure with an embedded, high resistance wire for uniform Joule heating for reduced power consumption and temperature ramp-up time during a desorption process.

2 Claims, 6 Drawing Sheets

PROCESS FOR FABRICATING WIRE-EMBEDDED ZEOLITE STRUCTURES WITH BARE WIRE LEADS

STATEMENT REGARDING FEDERALLY SPONSORED RESEARCH OR DEVELOPMENT

This invention was made with government support under 80NSSC22PB082 awarded by National Aeronautics and Space Administration. The government has certain rights in the invention.

CROSS-REFERENCE TO RELATED APPLICATIONS

This application is related to currently pending U.S. patent application Ser. No. 18/177,836, filed Mar. 3, 2023, titled WIRE-EMBEDDED ZEOLITE STRUCTURES WITH BARE WIRE LEADS, and U.S. patent application Ser. No. 18/177,819, filed Mar. 3, 2023, now U.S. Pat. No. 12,327,657, titled APPARATUS FOR THE FABRICATION OF WIRE-EMBEDDED ADSORBENT STRUCTURES WITH BARE WIRE LEADS, the disclosures of which are hereby incorporated by reference in this application.

BACKGROUND

The present disclosure is directed to the process for making a wire embedded zeolite bed/structure during an additive manufacturing (3D printing) process.

Zeolites are a class of microporous materials that are commonly used in adsorbent applications. Depending on the specific (e.g., 13X, 4A) zeolite used, they may be suited for the adsorption of $CO_2$, $H_2O$, $SO_2$, or other compounds. Typically, zeolites are contained in a structure or bed with a fluid running through it containing a concertation of the desired compound to be adsorbed. Once the zeolite's pores are saturated, they can be heated to release the adsorbed compounds to a purge fluid running through the zeolite structure or bed in a process called desorption.

In specific applications, such as space or deep-water exploration, it is critical to minimize the size of the zeolite system as a whole, and reduce the power consumption during the desorption process. Traditionally, desorption is driven by heating blankets wrapped around the zeolite structure or bed, or by heating elements incrementally placed in the structure/bed after manufacturing. Due to the poor thermal conductivity of the zeolite material, hot spots can be created where the heating element(s) contact the zeolite system.

By embedding a wire into the zeolite bed/structure, specifically a wire with a high (>1 $\Omega$/ft) resistivity (e.g., Nickel-chromium), the zeolite can be heated for desorption by Joule heating with the embedded wire; resulting in uniform heating of all sections of the structure. Additionally, the embedded wire serves to mechanically reinforce the structure, and reduces the overall size of the system as the heaters are inherently embedded directly into the structure.

However, in order to perform Joule heating, it is necessary to connect the embedded wire to a power source. Therefore, it is necessary to not only be able to fabricate structures with embedded wires, but additionally be able to extrude bare wire sections both before and after laying the wire-embedded roads.

For the preceding reasons, there is a need for a process to fabricate a zeolite structure with an embedded heating element to decrease system size, power consumption, and temperature ramp-up time, and enhance its mechanical properties.

SUMMARY

A process for fabricating a structure of a zeolite-based paste with an intra-layer continuous wire embedded is disclosed. The structure is made of multiple layers stacked together, produced by an additive manufacturing (3D printing) process. Within this structure, at least one wire is embedded through a section of a layer or a layer in its entirety, where the wire comprises of both the encapsulated section within the structure and two bare wire leads protruding from the structure. The flowcharts for the overall process of the structure fabrication, as well as a flowchart for the specific process of fabricating the wire embedded layers is disclosed. The primary goal of this process is to fabricate a zeolite structure with an embedded, high resistance wire for uniform Joule heating for reduced power consumption and temperature ramp-up time during a desorption process.

In one implementation the process includes a method for fabricating a wire embedded zeolite structure constructed by at least one of infill and perimeter roads to form layers using an additive manufacturing technique by inputting a first layer to embed the wire WF; inputting a frequency to embed additional wires Wg; initializing a layer index L to 1; comparing a current layer index L to WF; at least one of extruding a road of zeolite when WF is less than L and extruding a road of zeolite having an embedded wire therein when WF is equal to L; continuing the extrusion roads as above until the layer is printed; incrementing L by 1; calculating a remainder with (L−WF) mod WG; at least one of extruding a road of zeolite when the remainder is greater than zero and extruding a road of zeolite having an embedded wire therein when the remainder is zero; continuing the extrusion of roads in step h until the layer is printed; and repeating the steps above until the last layer is extruded. For layer where the wire is being extruded the implementation further includes inputting a bare wire lead length WL; inputting a section to embed the wire selected from the group consisting of infill road and perimeter road; based on inputted section to embed the wire being selected as not both infill road and perimeter road, extruding first zeolite section of road, next extruding a bare wire lead-in with length WL, then next extruding zeolite having the embedded wire therein; based on inputted section to embed the wire being selected as both infill road and perimeter road, extruding bare wire lead with length WL, and next extruding zeolite having the embedded wire therein; extruding a bare wire lead out with length WL; and cutting the bare wire lead out.

In another implementation of the process described herein there is a method for fabricating a wire embedded zeolite structure constructed by at least one of infill and perimeter roads to form layers using an additive manufacturing technique, the method characterized as:
  (a) inputting a first layer to embed the wire $W_F$;
  (b) inputting a frequency to embed additional wires $W_g$;
  (c) initializing a layer index L to 1;
  (d) comparing a current layer index L to $W_F$;
  (e) extruding a road of zeolite based on $W_F$ is less than L;
  (f) extruding a road of zeolite with an embedded wire therein based on $W_F$ is equal to L;
  (g) continuing the extrusion roads in steps (e) and (f) until the layer is printed;
  (h) incrementing L by 1;
  (i) calculating a remainder with (L-$W_F$) mod $W_G$;

(j) extruding a road of zeolite based on the remainder is greater than zero;
(k) extruding a road of zeolite with an embedded wire therein based on the remainder is zero;
(l) continuing the extrusion of roads in steps (j) and (k) until the layer is printed;
(m) repeating steps (h) through (l) until the last layer is printed.

For steps (f) and (k) there are further processes characterized as:
(1) inputting a bare wire lead length $W_L$;
(2) inputting a section to embed the wire selected from the group consisting of infill road and perimeter road;
   (i) extruding first zeolite section of road, extruding next a bare wire lead-in with length $W_L$, extruding next zeolite with the embedded wire therein based on inputted section to embed the wire being selected as not both the infill road and the perimeter road;
   (ii) extruding bare wire lead with length $W_L$, and next extruding zeolite having the embedded wire therein based on inputted section to embed the wire being selected as both the infill road and the perimeter road;
(3) extruding a bare wire lead out with length $W_L$; and
(4) cutting the bare wire lead out.

BRIEF DESCRIPTION OF THE DRAWINGS

These and other features, aspects, and advantages of the disclosure will become better understood given the following description, appended claims, and accompanying drawings where:

DESCRIPTION

Figure 1:
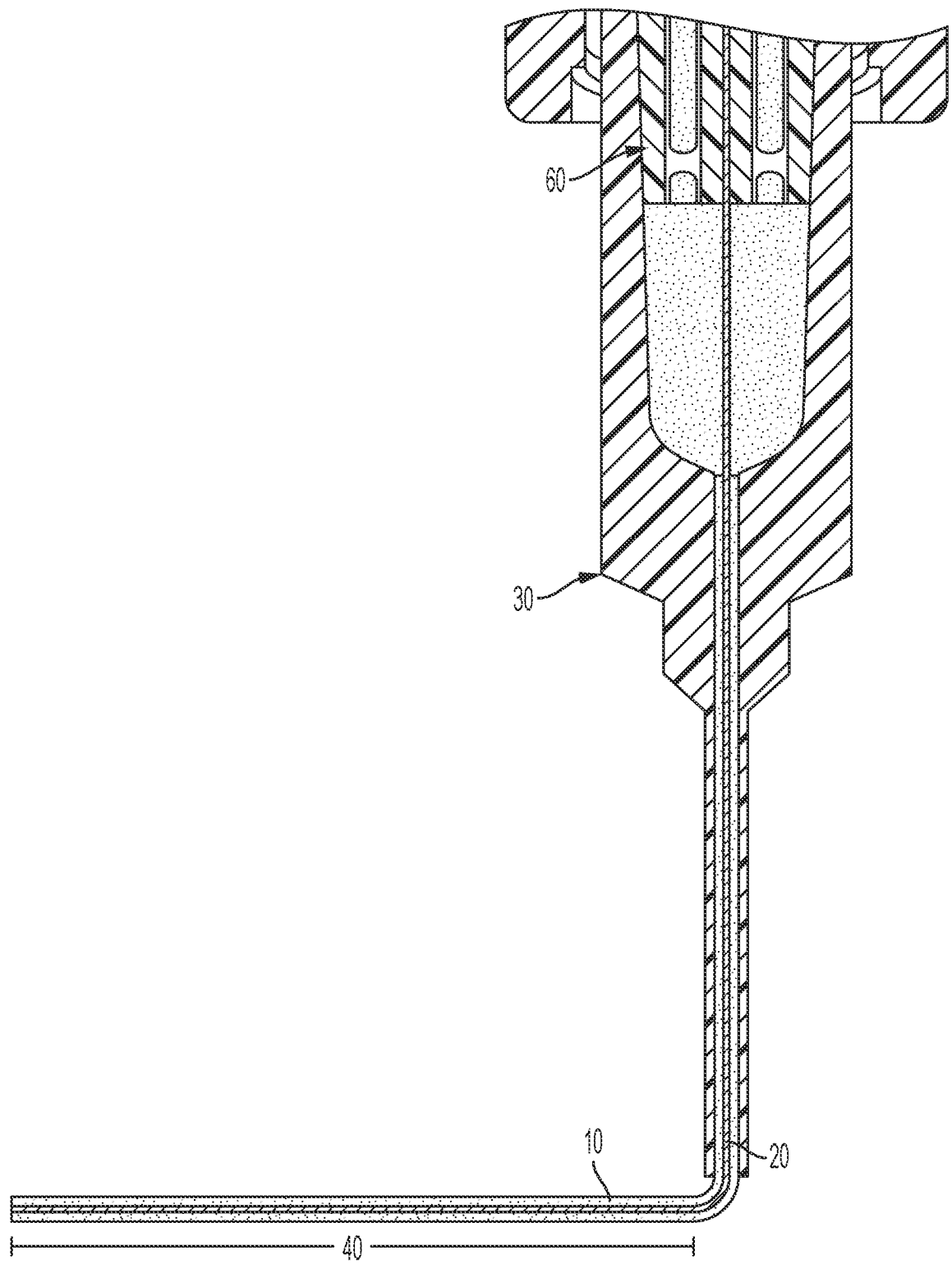
FIG. 1 shows a cut away side view of a wire embedded zeolite road being extruded.

In the Summary above and the Description, and the claims below, and in the accompany drawings, reference is made to particular features (including method steps) of the implementations with the disclosure. It is to be understood that the disclosure of the implementations in this description include all possible combinations of such particular features. For example, where a particular aspect or embodiment of the implementation, or a particular claim, that feature can also be used, to the extent possible, in combination with and/or in the context of the other particular aspects and implementations of the disclosure, and in the disclosure generally.

This disclosure is primarily aimed at the process for fabricating a wire embedded zeolite structure. Specifically, the structure to be fabricated comprises:
a. roads fabricated primarily of a zeolite material 10, modified by adding various fillers (e.g., water, methyl cellulose) to achieve a paste-like consistency for the 3D printing process. Sintering post-fabrication removes these fillers, resulting in pure zeolite roads;
b. at least one layer with a high (>1 $\Omega$/ft) resistivity (e.g., Nickel Chromium) wire 20 embedded within it 40. Specifically, the wire 20 is embedded nominally in the center of the layer 40, but may not traverse the layer in its entirety; and
c. two bare wire leads 50 protruding from the structure per wire embedded layer for attachment to an external source such as a power supply.

The zeolite roads printed have no required curing mechanism (e.g., photoinitiator) in order to assist with the wire embedding. This process is not dependent on curing, drying, or solidifying of the printing medium to achieve the disclosed results. This is vital to being able to fabricate the bare wire leads 50 that allow for the wire-embedded layers to be attached to an external source such as a power supply.

The process to fabricate this structure is accomplished by the layer-by-layer fabrication method characteristic of the 3D printing process where each layer is fabricated by the zeolite paste 10 and may contain an embedded wire 20. A single, shared nozzle 30 is used for both the zeolite paste 10 and the wire in order for the wire to centered within each road 40. When only zeolite 10 is extruded, the wire is retracted into the nozzle 30 such that is does not touch the layer being deposited. When only wire is extruded 50, the zeolite paste 10 is either retracted into the nozzle 30 or wiped from the end of the nozzle 30 to ensure the wire extruded is not encapsulated in the zeolite 50.

The first layer to contain an embedded wire, and the frequency of wire embedded layers thereafter are configurable for the specific application of the system, and are represented by WF and Wg, respectively. The first layer with an embedded wire may be inconsistent with the desired frequency than the rest of the structure due to the specific application. For example, a sacrificial raft layer may be required to bond the structure to the printing substrate.

In this disclosure, the frequency ($W_g$) refers to the number of layers from the last embedded wire to the last layer (L) before another wire is embedded; that is if the $W_g$=2, and $W_F$=3, a wire will be embedded on layers 3, 5, 7, 9, etc., In this example embodiment the frequency is a set value, in another embodiment the frequency could be an equation for a linear or nonlinear frequency.

FIG. 1 depicts the co-extrusion of both the zeolite paste 10 and an encapsulated wire 20. In this process, the wire 20 is handled separately from the zeolite paste 10 by the mechanism 60 (see co-filed patent application entitled APPARATUS FOR THE FABRICATION OF WIRE-EMBEDDED ADSORBENT STRUCTURES WITH BARE WIRE LEADS) until transfer into the dispensing nozzle 30. The wire 20 is pushed by the mechanism 60, not pulled by the zeolite paste; allowing for the extrusion of bare wire leads.

Figure 2:
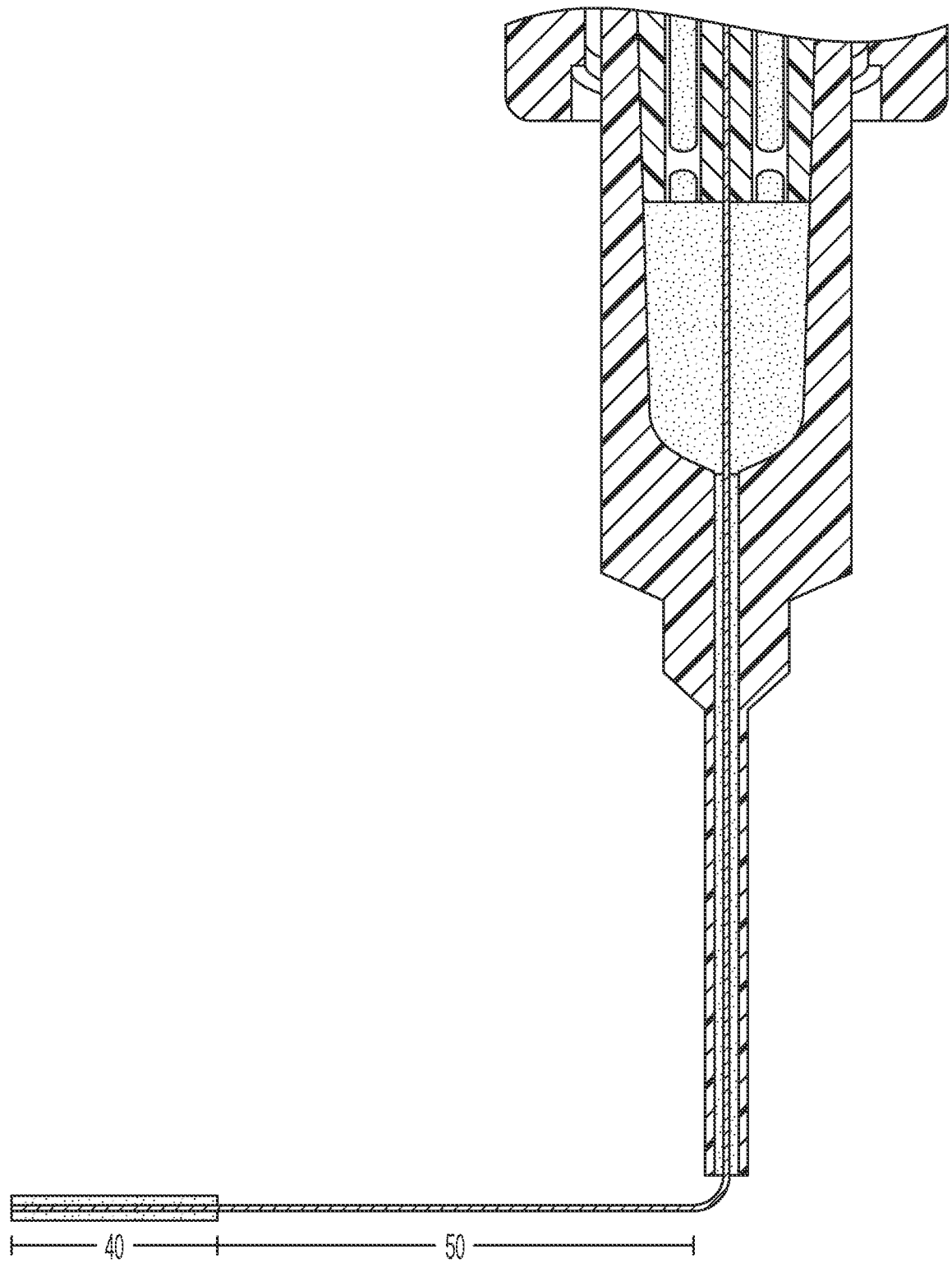
FIG. 2 shows a cut away side view of a bare wire road being extruded.

FIG. 2 depicts the extrusion of a bare wire lead 50. This is the section that is used for connection to the power source for electrification of the wire. The length of the lead 50 ($W_L$) is configurable to allow for flexibility in the attachment method.

Figure 3:
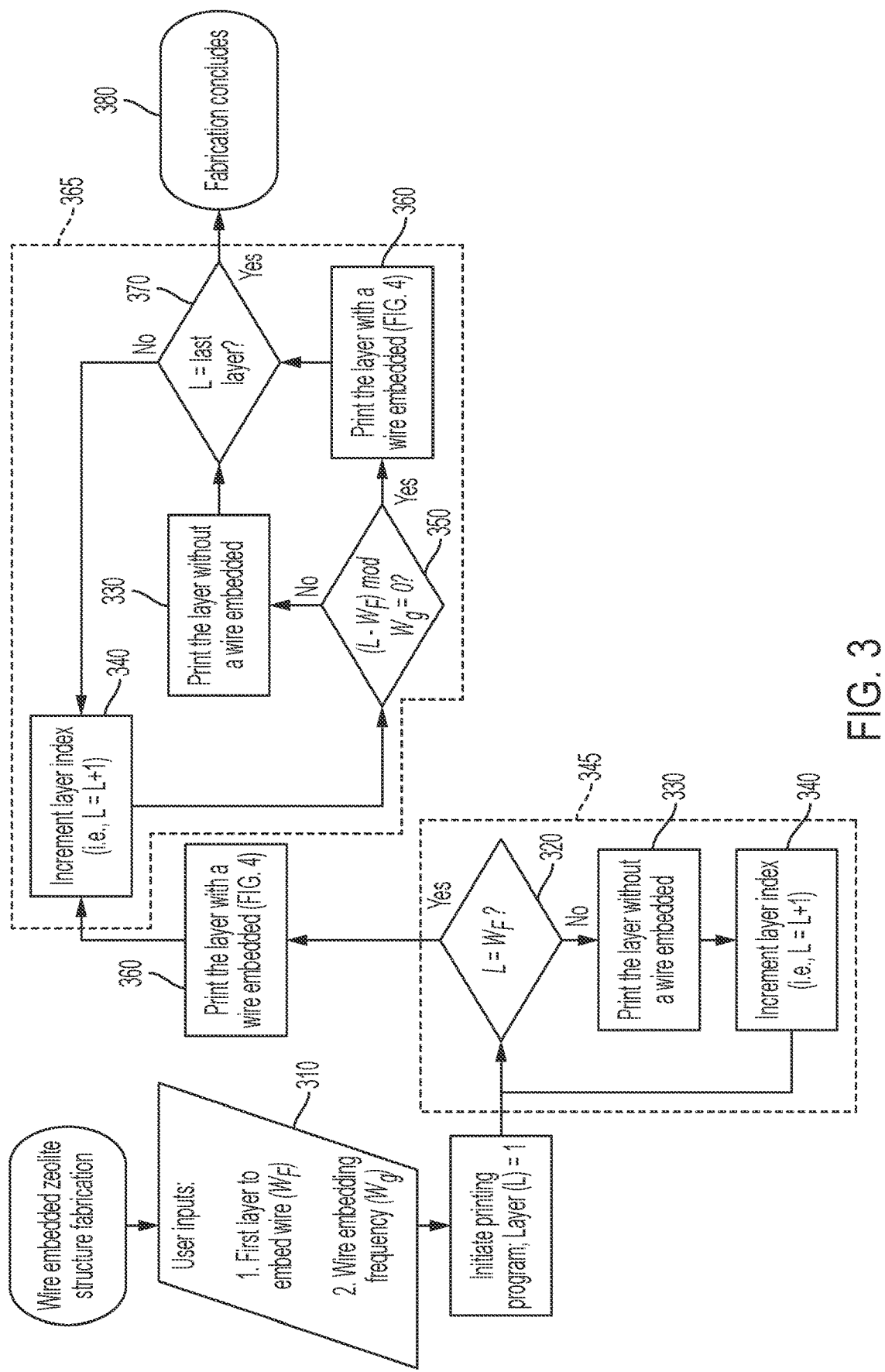
FIG. 3 shows a flowchart of the overall process of fabricating a wire embedded zeolite structure.

FIG. 3 is a flowchart depicting the overall fabrication process. The structure itself can be designed by any of various computer aided design (CAD) programs, with any feature typical of the 3D printing process. To convert the CAD data into a toolpath the 3D printer can execute, a program called a 'Slicer' is typically used; this program slices the CAD model into discrete layers to create the layer-by-layer toolpath characteristic of 3D printing. The disclosed process uses this same process, and the user can use any CAD and slicing program desired.

To begin this process, the user inputs $W_F$ and $W_g$ 310, which defines the first layer to embed the wire and the frequency to embed additional wires thereafter, respectively. The toolpath program is then started, and the layer index is initialized to 1.

Figure 4:
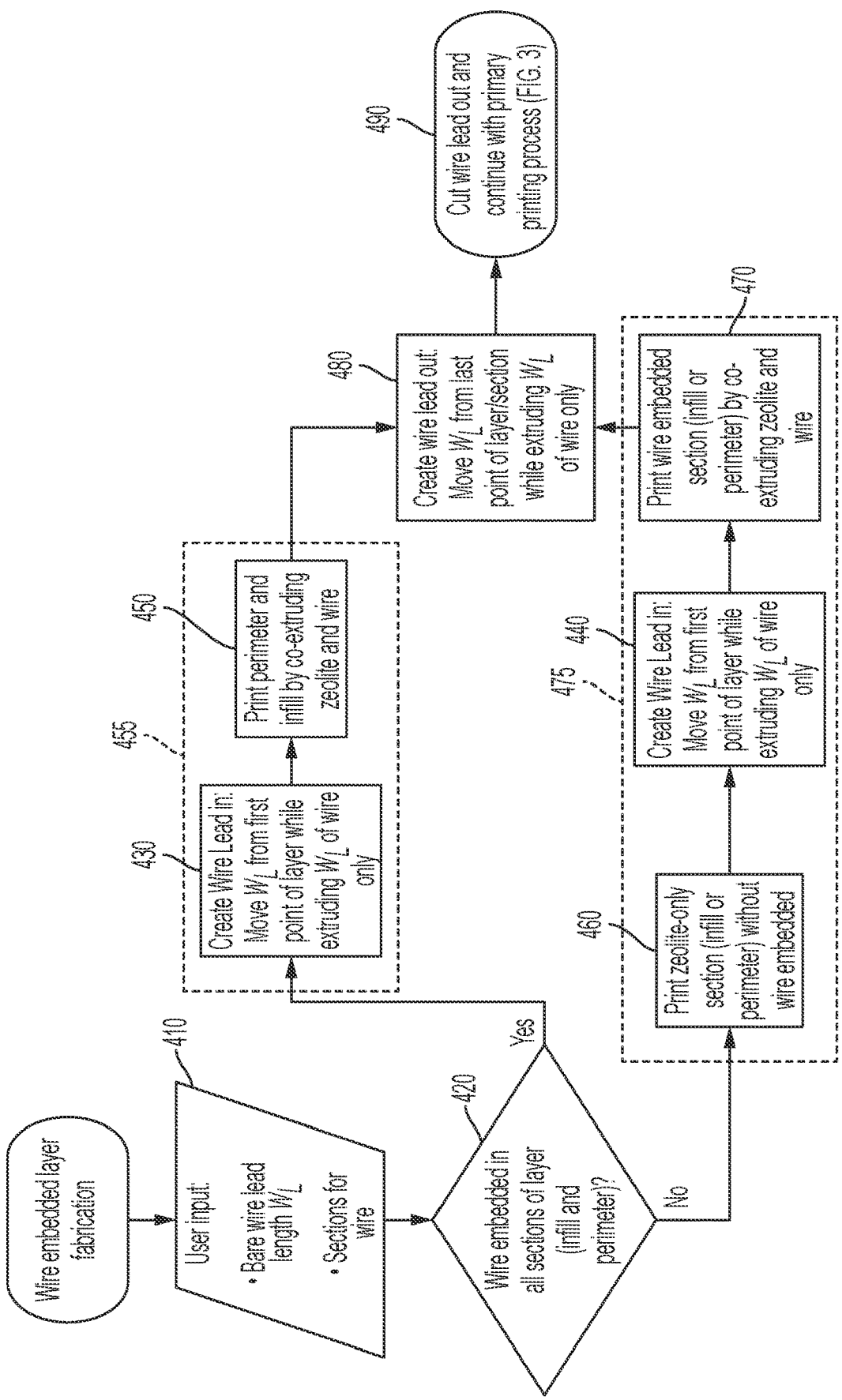
FIG. 4 shows a flowchart of the specific process of fabricating a wire embedded layer with bare wire leads.

Before each layer L until $W_F$ is reached, the current layer index is checked against $W_F$ 320. While $W_F$ is lesser than the current layer index, a layer of zeolite is printed without a wire embedded; that is the layer is printed with only the zeolite paste 330. If the current layer L is equal to $W_F$, that layer is printed with a wire embedded in it 360; this process is depicted in FIG. 4 and described starting in paragraph [0032].

After each layer is printed, irrespective of whether a wire was embedded or not, the layer index L is incremented 340. While $W_F$ is greater than L, the first loop 345 is repeated. Once the first layer is printed with a wire embedded in it 360, and L is incremented 340, the second loop 365 is initiated.

To determine if a wire is to be embedded in a layer while the layer index L is greater than first layer to embed a wire $W_F$, this process uses an equation to compare the current layer index against the desired frequency. FIG. 3 shows an equation ($[(L-W_F) \mod W_g=0]$) where the modulus operator is used to find the remainder of the division of $(L-W_F)$ and $W_g$ 350. If the remainder is 0, we know the current layer index is a multiple of the frequency $W_g$ starting at $W_F$, and a wire is embedded in that layer 360. If the remainder is not 0, we know the current layer index is a not a multiple of the frequency $W_g$ starting at $W_F$, and a wire is not embedded in that layer 330.

For example, if the current layer L is 8, the first layer to embed a wire $W_F$ is 6, and the frequency to embed a wire is 2, then $[(L-W_F) \mod W_g=(8-6) \mod 2=0]$; so, a wire-embedded road is extruded. However, when the layer index L is incremented to 9, this equation becomes $[(9-6) \mod 2=1]$; so, a zeolite-only road is extruded. While 350 shows a specific equation, and this specific approach is described here, it is understood there are other functionally equivalent approaches that could be used for this decision.

Until the last layer is deposited (layer index L is equal to the last layer index 370), loop 365 is repeated. Once the last layer is deposited, the program terminates and fabrication is complete. Post-fabrication, the zeolite can be sintered either in a traditional sintering oven or by electrifying the embedded wires 20. In both cases, an optimized temperature ramp rate is critical to reducing cracking within the structure—this temperature ramp is dependent on structure size and design, paste composition, road width and layer height, and embedded wire diameter. Additionally, depending on the zeolite paste composition, it may be necessary to electrify the wires 20 prior to sintering until the desorption temperature is reached. This will reduce the stress due to the thermal expansion of the wire 20 against the encapsulating sintered zeolite structure.

Figure 5:
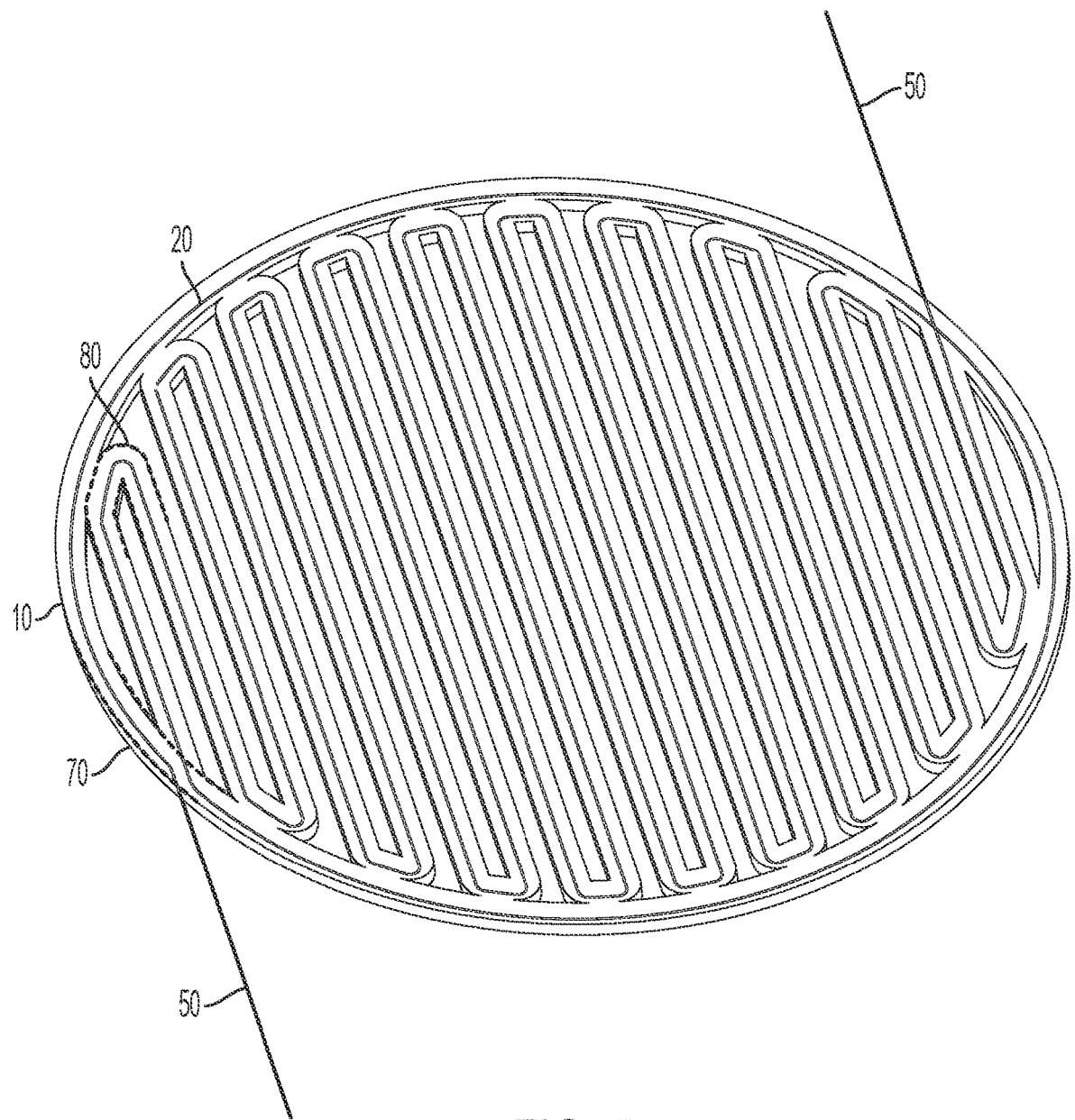
FIG. 5 shows an isometric view of a single layer of a zeolite structure with a continuous wire running throughout the entire layer (i.e., through the perimeter wall and the infill).
Figure 6:
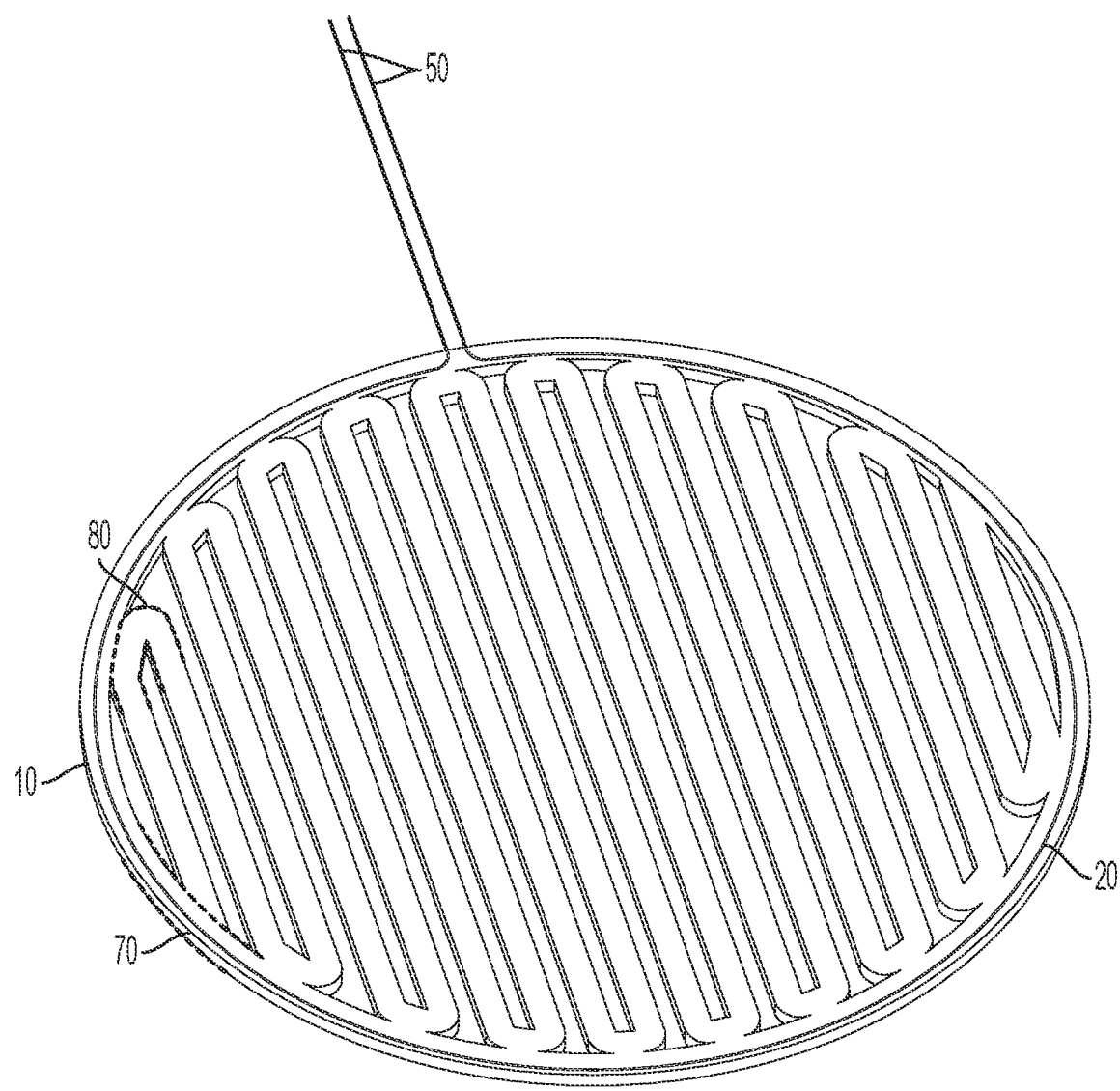
FIG. 6 shows an isometric view of a single layer of a zeolite structure with a continuous wire running through just the perimeter wall.

FIG. 4 is a flowchart depicting the specific wire-embedded layer fabrication process. To begin this process, the user inputs $W_L$ 410, which defines the desired length of the bare wire leads protruding from the structure. This variable is typically defined a single time at the beginning of the overall program. Additionally, the user inputs the desired section(s) of the part that they wish for a wire to be embedded in—perimeter section 70, infill section 80, or both. Two possible embodiments of this selection are shown in FIG. 5 and FIG. 6, where the wire 20 is embedded in both the infill 80 and perimeter 70 sections and where the wire 20 is only embedded in the perimeter 70 section, respectively. In both embodiments and all other embodiments, bare wire leads 50 protrude from the structure.

Depending on the desired sections for wire to be embedded in 420, the process either progresses to subprocess 455 (wire in both infill and perimeter sections of a layer) or 475 (wire in one of perimeter or infill sections of a layer). If a wire is to be embedded in both infill and perimeter sections of a part (FIG. 5), a wire lead in is created by extruding only wire a distance of $W_L$ while moving the printhead 430. In another embodiment, the wire lead in could be extruded by a stationary printhead, or, in yet another embodiment, the wire lead in could be extruded into a secondary system or material to aid in wire management. Once the wire lead in is extruded 50, the layer is printed by co-extruding the wire 20 and zeolite paste 10 simultaneously to produce a wire-embedded zeolite road.

If a wire is not to be embedded in all sections of a part, the section (infill 80 or perimeter 70) without a wire embedded is first fabricated out of the zeolite paste 10. Once the zeolite-only section is fabricated, a wire lead in 50 is created by extruding only wire a distance of $W_L$ while simultaneously moving the printhead 430. Unlike the process when the entire layer has an embedded wire 455, the printhead is moved from the first point of the section to contain a wire when extruding the bare wire lead 50, rather than the first point of the layer. Once the bare wire lead 50 is extruded, the wire-embedded section is fabricated.

After either subprocess 455 or 475, a wire lead out 50 is created 480. This process is similar to that of the wire lead in, with the key difference being the criticality of the wire extrusion and motion speed. The wire extrusion speed must be equal to or greater than the motion speed of the printhead as it moves away from the part, otherwise the wire 20 will be pulled from the wire-embedded zeolite road 10. Similar to the wire lead in fabrication, a distance of $W_L$ is extruded during this process. In another embodiment, the length of the wire lead in and wire lead out could be two separate lengths. After the bare wire lead out 50 has been extruded, the wire is cut and the layer index is incremented to the next layer 490. The wire can either be cut by an integrated mechanism such as a pneumatic shear cutter, or can be cut manually.

Post-sintering, the structure is ready for use. The sintering procedure is driven by the specific composition of the zeolite paste. The wire leads 50 protruding from the structure can be attached to each other and the power supply via a bus bar, terminal block, direct soldering, or other method. The wires can be electrified directly at a specific ramp, or through a control strategy such as PID or Fuzzy Logic by embedding or attaching a thermocouple into/onto the structure. A standard zeolite activation procedure may be used to initially desorb the structure, thermally driven either by a traditional oven or by the embedded wires 50.

What is claimed is:

1. A method for fabricating a wire embedded zeolite structure constructed by at least one of infill and perimeter roads to form layers using an additive manufacturing technique, the method comprising:
    (a) inputting a first layer to embed the wire $W_F$;
    (b) inputting a frequency to embed additional wires $W_g$;
    (c) initializing a layer index L to 1;
    (d) comparing a current layer index L to $W_F$;
    (e) extruding a road of zeolite based on $W_F$ is less than L;
    (f) extruding a road of zeolite with an embedded wire therein based on $W_F$ is equal to L;
    (g) continuing the extrusion roads in steps (e) and (f) until the layer is printed;

(h) incrementing L by 1;
(i) calculating a remainder with $(L-W_F)$ mod $W_g$;
(j) extruding a road of zeolite based on the remainder is greater than zero;
(k) extruding a road of zeolite with an embedded wire therein based on the remainder is zero;
(l) continuing the extrusion of roads in steps (j) and (k) until the layer is printed;
(m) repeating steps (h) through (l) until the last layer is printed.

2. The method of claim 1, wherein steps (f) and (k) further comprises:
(1) inputting a bare wire lead length $W_L$;
(2) inputting a section to embed the wire selected from the group consisting of infill road and perimeter road;
  (i) extruding first zeolite section of road, extruding next a bare wire lead-in with length $W_L$, extruding next zeolite with the embedded wire therein based on inputted section to embed the wire being selected as not both the infill road and the perimeter road;
  (ii) extruding bare wire lead with length $W_L$, and next extruding zeolite having the embedded wire therein based on inputted section to embed the wire being selected as both the infill road and the perimeter road;
(3) extruding a bare wire lead out with length $W_L$; and
(4) cutting the bare wire lead out.

* * * * *